United States Patent [19]

Adams

[11] 3,972,248
[45] Aug. 3, 1976

[54] RACK AND PINION STEERING MECHANISM
[75] Inventor: Frederick John Adams, Campton, England
[73] Assignee: Cam Gears Limited, Hitchin, England
[22] Filed: Apr. 24, 1975
[21] Appl. No.: 571,290

[30] Foreign Application Priority Data
May 7, 1974 United Kingdom........... 20046/74

[52] U.S. Cl. ............................... 74/498; 74/422
[51] Int. Cl.[2] ..................... B62D 1/20; F16H 1/04
[58] Field of Search ................... 74/422, 498

[56] References Cited
UNITED STATES PATENTS

| | | | |
|---|---|---|---|
| 3,225,620 | 12/1965 | Dubin | 74/498 X |
| 3,753,378 | 8/1973 | Bishop | 74/422 |
| 3,823,617 | 7/1974 | Infanger et al. | 74/498 |

FOREIGN PATENTS OR APPLICATIONS 1000594  8/1965  United Kingdom............74/498

Primary Examiner—Leonard H. Gerin

[57] ABSTRACT

A rack and pinion steering mechanism for a vehicle comprises a rotatable steering input. The rack is displaceable to effect vehicle steering, and drive means drivingly interconnects the input and the rack to effect displacement of the rack upon rotation of the input means. The drive means comprises an axially fixed primary pinion, a gear portion on the rack and gear means interposed between the primary pinion and the gear portion of the rack. The gear means includes at least one helical pinion gear and the primary pinion, or gear portion of the rack has helical teeth meshing with the helical teeth of at least one helical pinion gear. A cam means is provided responsive to rotation of the primary pinion to effect axial displacement of the helical pinion to produce a variation in the movement ratio between the primary pinion and the rack.

8 Claims, 1 Drawing Figure

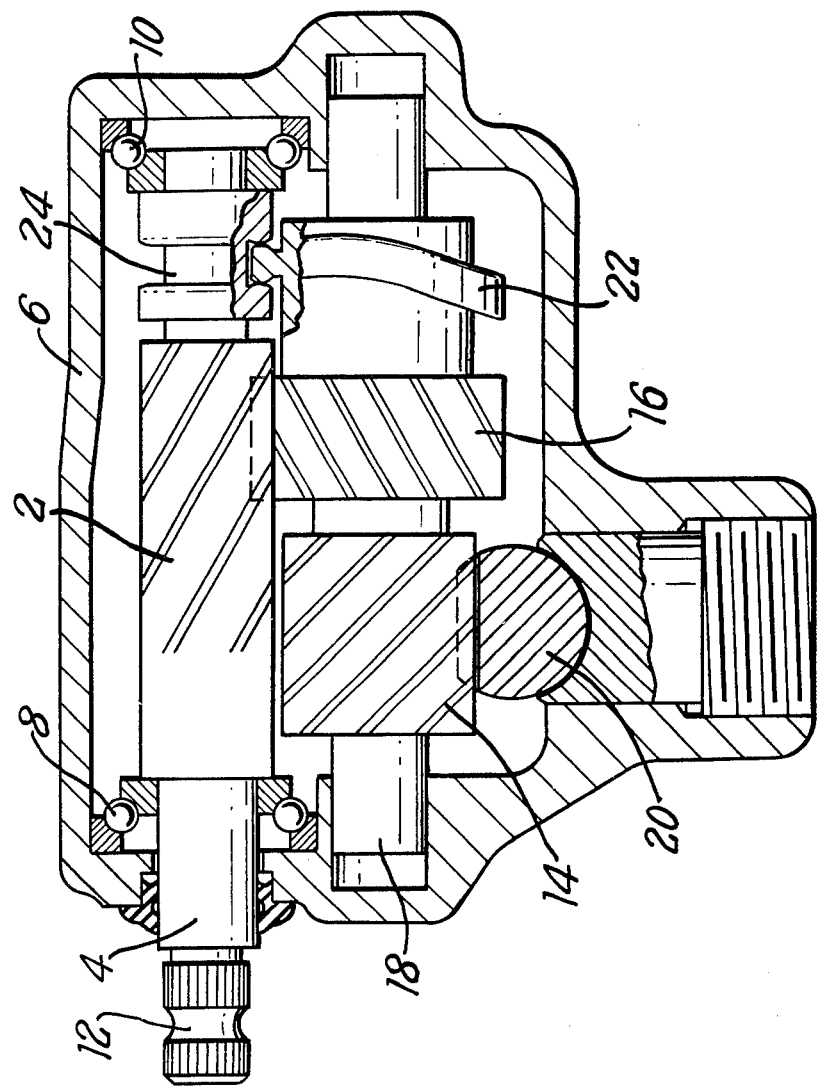

RACK AND PINION STEERING MECHANISM

The present invention relates to a rack and pinion steering mechanism for a vehicle, in which linear displacement of the rack is produced by rotation of the pinion.

The invention is particularly concerned with such a mechanism which enables the movement ratio between the pinion and the rack to vary over the range of movement of the steering mechanism. The term "movement ratio" is herein defined as meaning the linear movement of the rack produced by unit rotation of the pinion. One way of achieving this variation is to arrange the pinion in direct engagement with the rack by means of teeth which are inclined to the rotational axis of the pinion, and to effect controlled axial displacement of the pinion during its rotation.

The pinion is coupled to one end of a steering column having a steering wheel at its other end, and consequently this steering column and steering wheel are moved axially with the pinion. This axial movement of the steering column and steering wheel can produce difficulties particularly with a power assisted steering system.

It is an aim of the invention to at least reduce the above-mentioned difficulties, and accordingly the present invention provides a rack and pinion steering mechanism for a vehicle, comprising an axially fixed rotatable primary pinion intended for rotation with the vehicle steering wheel, a secondary pinion rotatable in response to the primary pinion to effect displacement of an engaged rack, and cam means responsive to rotation of the primary pinion to effect axial displacement of the secondary pinion during its rotation, in which rotary drive is transmitted from said primary pinion to said rack by at least one set of mutually engaging helical teeth whereby said axial displacement of the secondary pinion produces a variation in the movement ratio between the first pinion and the rack.

The secondary pinion may be fixedly connected to a gear wheel which engages the primary pinion. The cam means may comprise a mutually engaging cam projection and a cam recess which are rotatable with one each of the primary and secondary pinions. The recess and projection are suitably shaped so that rotation of the primary pinion causes the secondary pinion to be moved axially by its respective cam projection or recess.

In one arrangement, the primary pinion and gear wheel are coupled by mutually engaging straight teeth and the secondary pinion and rack are coupled by mutually engaging helical teeth. In another arrangement the primary pinion and gear wheel are coupled by mutually engaging helical teeth, and the secondary pinion and rack are coupled by mutually engaging straight teeth. In a further arrangement, all the mutually engaging teeth may be helical.

One rack and pinion mechanism of the invention will now be described by way of example with reference to the accompanying drawing which is a side elevation in section of a rack and pinion steering mechanism for a vehicle.

Referring to the drawing, the steering mechanism includes a primary pinion 2 located on a shaft 4 which is rotatably mounted in a casing 6 by ball bearing assemblies 8 and 10. The shaft 4 has a coupling 12 mounted at one end, which is intended for connection to one end of a vehicle steering column (not shown). A secondary pinion 14 and a gear wheel 16 are fixedly mounted on a shaft 18. Opposite ends of this shaft 18 are rotatably mounted in respective tubular portions of the casing 6, which are dimensioned so that the shaft 18, and hence the secondary pinion 14, can be moved axially within the casing 6. The secondary pinion 14 meshes with a rack 20 which extends transversely through the casing 6. A radially projecting cam track 22 extends circumferentially around the shaft 18 and is retained in an annular circumferential recess 24 in the shaft 4.

Teeth on the primary pinion 2 engage corresponding teeth on the gear wheel 16, and teeth on the secondary pinion 14 engage corresponding teeth on the rack 20. As shown in the drawing, both sets of mutually engaging teeth are helical.

The cam track 22 is retained in the cam recess 24 throughout rotation of the shafts 4 and 18. As seen from the drawing, the cam track 22 is generally helical, and consequently has a component of direction parallel to the rotational axis of the shaft 18. Therefore, on rotation of the shaft 4, the primary pinion 2 effects rotation of the gear wheel 16 and hence the secondary pinion 14. This rotation of the secondary pinion 14 effects axial displacement of the rack 20 to produce the required steering movement of the vehicle road wheels. In addition, rotation of the shaft 4 causes the cam track 22 and recess 24 to produce axial movement of the shaft 18 in dependence upon the shaping of that part of the cam track which is passing through the recess 24 during rotation of the shaft 4. This axial movement of the shaft 18, and hence the secondary pinion 14, causes the rack 20 to traverse at a rate which is greater or less than that which would be achieved solely by the rotation of the secondary pinion 14. This difference in the rack traverse rate is dependent upon the shape and hand of the helical cam track 22. For example, if the cam track 22 is of the same hand as the helix of the two sets of engaging teeth, then some of the transverse movement which would otherwise be transmitted to the rack 20 by the secondary pinion 14 is lost. Therefore the rack 20 is caused to traverse at a rate which is less than that which would be achieved if the rack drive were transmitted solely by rotation of the secondary pinion 14. Conversely, if the helix of the cam track 22 is of opposite hand to the helices of the two sets of mutually engaging teeth, then the rack 20 is caused to traverse at a rate greater than that which would result solely from rotation of the secondary pinion 14.

It is this difference in rack traverse from that which would be achieved solely by rotation of the secondary pinion 14 which produces the required variation in movement ratio between the primary pinion 2 and the rack 20.

In the above described steering mechanism, both sets of mutually engaging teeth are helical. In modified mechanisms, either one of the two sets of mutually engaging teeth may be straight and parallel to the rotational axes of the shafts 4 and 18. It will be appreciated that these modified arrangements provide a smaller variation in the movement ratio between the primary pinion and the rack than the mechanism in which both sets of mutually engaging teeth are helical.

The above described steering mechanisms enable a vehicle to have a different movement ratio in the straight ahead position from the movement ratio when on full steering lock in either direction.

Having described the invention, what is claimed is:

1. A rack and pinion steering mechanism for a vehicle, comprising an axially fixed rotatable primary pinion intended for rotation with the vehicle steering wheel, a secondary pinion rotatable in response to the primary pinion to effect displacement of an engaged rack, and cam means responsive to rotation of the primary pinion to effect axial displacement of the secondary pinion during its rotation, in which rotary drive is transmitted from said primary pinion to said rack by at least one set of mutually engaging helical teeth whereby said axial displacement of the secondary pinion produces a variation in the movement ratio between the first pinion and the rack.

2. A steering mechanism as claimed in claim 1 in which the secondary pinion is fixedly connected to a gear wheel which engages the primary pinion.

3. A steering mechanism as claimed in claim 2, in which the secondary pinion and rack are coupled by said one set of mutually engaging helical teeth.

4. A steering mechanism as claimed in claim 2, in which the primary pinion and gear wheel are coupled by said one set of mutually engaging helical teeth.

5. A steering mechanism as claimed in claim 1, in which the cam means comprises a suitably shaped mutually engaging cam projection and a cam recess which are rotatable with one each of the primary and secondary pinions.

6. A steering mechanism as claimed in claim 5, in which the cam recess is of generally helical form.

7. A steering mechanism as claimed in claim 6, in which the cam recess is of the same hand as the said one set of mutually engaging helical teeth.

8. A rack and pinion steering mechanism for a vehicle comprising a rotatable steering input means, a rack displaceable to effect vehicle steering, drive means drivingly interconnecting said input means and said rack to effect displacement of said rack upon rotation of said input means, said drive means comprising, an axially fixed primary pinion rotatable with said input means, a gear portion of said rack, and gear means interposed between said primary pinion and said gear portion, said gear means including at least one pinion gear having helical teeth and said primary pinion or said gear portion of said rack having helical teeth meshing with the helical teeth of said one pinion gear, and cam means responsive to rotation of said primary pinion to effect axial displacement of said one pinion gear to produce a variation in the movement ratio between said primary pinion and said rack.

* * * * *